United States Patent [19]

Garzon

[11] Patent Number: 5,259,698
[45] Date of Patent: Nov. 9, 1993

[54] METHOD FOR HIDING FROM SIGHT AND PROTECTING A DUMPING SITE

[76] Inventor: Maurice Garzon, 2455 Edouard Montpetit, Apt. 4, Montreal, Quebec, Canada, H3T 1J5

[21] Appl. No.: 818,857

[22] Filed: Jan. 10, 1992

Related U.S. Application Data

[63] Continuation-in-part of Ser. No. 713,319, Jun. 11, 1991, abandoned.

[30] Foreign Application Priority Data

Jun. 19, 1990 [CA] Canada ................................ 2019302

[51] Int. Cl.⁵ ................................................ B09B 1/00
[52] U.S. Cl. ............................................ 405/129; 52/3
[58] Field of Search ................. 405/19, 128, 129, 52, 405/66; 52/3; 428/271

[56] References Cited

U.S. PATENT DOCUMENTS

| | | | |
|---|---|---|---|
| 2,406,779 | 9/1946 | Kurlychek | 428/271 |
| 3,289,415 | 12/1966 | Merrill | 405/52 X |
| 3,664,504 | 5/1972 | Ayers et al. | 405/66 X |
| 3,837,169 | 4/1974 | Lamberton | 405/19 X |
| 4,300,856 | 11/1981 | Magoon et al. | 405/66 |
| 4,844,840 | 7/1989 | Feizdlahi | 405/129 X |
| 4,909,667 | 3/1990 | De Mello | 405/128 |
| 5,040,572 | 8/1991 | Lindberg | 405/18 X |
| 5,041,330 | 8/1991 | Heerten et al. | 405/104 X |
| 5,161,915 | 11/1992 | Hansen | 105/129 |

FOREIGN PATENT DOCUMENTS 3802085  7/1989  Fed. Rep. of Germany ...... 405/129

Primary Examiner—Randolph A. Reese
Assistant Examiner—John Ricci
Attorney, Agent, or Firm—ROBIC

[57] ABSTRACT

A method for hiding from sight and protecting a dumping site containing inflammable and/or bad-looking waste, such as, for example, used tires. The method comprises spreading a covering membrane capable of covering the solid wastes and the gaps existing therebetween over the site or part of it, and subsequently spraying onto covering membrane, from a given distance away from the site, a thin layer of cementitious product or granular soil material to cover the some, the projected or blown product or material being subsequently used, if desired, as a support to convert the site into a landscape. The method can be used in the case of a fire, to cover the site and thus allow the fire to be choked down.

9 Claims, 1 Drawing Sheet

METHOD FOR HIDING FROM SIGHT AND PROTECTING A DUMPING SITE

CROSS-REFERENCE

This application is a continuation-in-part of application Ser. No. 07/713,319 filed on Jun. 11, 1991, now abandoned.

BACKGROUND OF THE INVENTION a) Field of the Invention

The present invention relates to a method for quickly and easily protecting and hiding from sight a dumping site containing inflammable and/or bad looking waste.

The invention also relates to a method for quickly and economically limiting the damages caused by a fire in a waste dumping site.

b) Brief Description of the Prior Art

It is well known that the dumping sites used to get rid of inflammable and/or bad looking waste such as, for example, used tires, are potential not to say permanent sources of pollution and fire, and thus are environmental nuisance.

A conventional method for reducing the risk of fire and hiding the waste from sight, consists in covering the site with earth as soon as it is filled up, so as to "bury" the waste. In practice, such a covering is usually done with a bulldozer or any similar having equipment.

U.S. Pat. No. 4,844,840 to FEIZOLLAHI discloses a method for the disposal of hazardous waste. In this patent, the hazardous wastes are sealed in large concrete boxes that are stacked in an interlocking manner to form an integrated monolithic structure above a barrier layer laid on the site to seal the ground surface from water passing through the structure and thus to prevent ground water contamination in the case of leaks. After stacking, the monolithic structure is sealed under the soil to allow for landscaping of the site. This is done by backfilling the structure with earth to provide for a relatively level top layer, then placing a synthetic liner over the backfill, and finally covering this liner with a thick layer of compacted clay, a layer of gravel and a layer of uncompacted fill earth.

This patent does not disclose how the sealing is carried out. However, it is obvious that the backfilling and covering steps require the use of heavy equipments right on the site, in order to bring, pour, spread and/or compact the backfill and the different layers of clay, gravel and earth.

The above method is obviously efficient to hide stacked waste-containing boxes from sight and to reduce the risk of fire hazard. However, it is rather long to carry out and cannot be used in any way if the dumping site is on fire, because it requires the use of heavy equipments on the site to complete its covering. Moreover, this known method is limited to flat surfaces or smooth slopes, because the covering layers of clay, gravel and fill earth are easily subject to erosion by rainfall or gravity.

OBJECT OF THE INVENTION

The object of the present invention is to provide a method for hiding from sight and protecting a dumping site by application thereto of a protective cover consisting of a covering membrane and a thin layer of a cementitious product or granular soil material, which method is much quicker and easier to carry out that the known method mentioned hereinabove and can even be carried out if the dumping site is on fire.

The method according to the invention comprises two basic steps that are very simple to carry out in a quick and very efficient manner.

The first step consists in spreading onto the dumping site a covering membrane such as a geotextile membrane or a thermotextile membrane if the site is on fire or fire prevention is an object of the required covering. The second step consists in projecting, blowing or more generally spraying a layer of a cementitious material, of a granular soil material or of both of them one after the other in any order, from a given distance away from the site, using a grout pump like the one sold by HANY & CIE A.G. of Switzerland, or a high pressure, large discharge output concrete projecting machine like those sold by ALIVA S.A. of Switzerland or by ALLENTOWN PNEUMATIC GUN, INC. of Pennsylvania, in order to cover the spreaded membrane, hide the same and choke the fire if any under the same by preventing air to pass.

In the present specification and appended claims, "cementitious product" means any kind of grout, mortar, shotcrate, gunite or concrete that can be sprayed by gun projection or blowing. By "granular soil material", there is meant sand, silt, gravel and similar granular substance that can be sprayed by gun projection or blowing.

An essential feature of the method according to the invention is that the covering layer is sprayed onto the covering membrane from a given distance away from the same. Accordingly, no equipment has to move on the site itself or even near the vicinity of the actual protection work in progress. Rather, the equipment may be installed at a remote distance from the area to be sprayed. Moreover, no worker needs to come close to the area being sprayed, thereby reducing the risk in the case of danger due to a fire in progress or in the case of cavities or holes present in the site.

Thus, both the spreading of the membrane and the subsequent spraying can be carried out quickly at a substantial distance away from the site. By "substantial distance" away from the site, there is meant from 5 to 20 meters away from the site, depending on the kind of equipment that is used for projecting or blowing the cementitious product or granular soil material and on the moisture content of the projected or blown product or material. Of course, the distance may be smaller if one wants to be, and can be closer to the site.

After completion of the covering, the resulting surface can be used as a support for converting the dumping site into a nice landscape since, after the cementitious product or granular soil material is sprayed and, eventually, hardened, it may be used as a support for a lawn, for water ponds or for vegetation zones. Alternatively, the cementitious product or granular may be painted or covered with artificial or natural lawn or with an any other products capable to make the resulting structure decorative and nice looking.

SUMMARY OF THE INVENTION

Thus, in accordance with a first embodiment of the invention, a method is provided for hiding from sight and protecting a dumping site containing inflammable and/or bad looking solid waste, which comprises the steps of:

a) spreading a covering membrane capable of covering the solid waste and the gaps existing therebetween over the site or part of it; and b) then spraying onto the covering membrane from a given distance away from the site, a layer of a cementitious product, of a granular soil material or of both a cementitious product and a granular soil material, in order to fully cover said membrane.

As indicated hereinabove, the covering membrane that is used, may be a geotextile membrane or a thermotextile membrane like the one sold under the trademark THERMO-CERAM, which is a kind of woven ceramic fiber fabric. Use can also be made of an asbestos sheet.

Such a use of a thermotextile or asbestos sheet is recommended when the dumping site to be protected is known to be a source of fire hazard.

In all cases, the cementitious product or granular soil material sprayed onto the covering membrane may be used as support to convert the site to a landscape.

In order to achieve better results, the shape of the site may be optimized in a artificial manner, by stacking the waste at given locations to build up hills, or by reducing the amount of waste at other locations to create recesses or ponds, thereby giving any predetermined shape to the covered surface that will be obtained after the covering membrane is spreaded onto the site and covered with a layer of cementitious product and/or granular soil material.

Everywhere the covering membrane spreaded onto the dumping site defines slopes due to some accumulation of waste, use is preferably made of a cementitious product for spraying purpose. Indeed, such a product may better adhere and bind to the membrane and thus reduce the risk of erosion that would otherwise destroyed an earth or soil cover.

In accordance with a preferred embodiment of the invention, use is made in the first step of a covering membrane having an upper surface provided with binding means projecting therefrom. Then, in the second step, use can be made of cementitious material exclusively, that can embed and adhere to said binding means to avoid sliding, sealing and poping of said covering layer.

The method according to the invention may also be used in the case of a fire disaster, to quickly and economically limit the damages that may be caused by the fire.

Thus, by way of example, when the disaster consists in a fire in a used tire dumping site, the method according to the invention can be used for choking the fire or prevent its propagation that may be dangerous to the firemen and/or workers and the environment.

Thus, according to another embodiment of the invention, a method is provided for quickly and economically limiting a fire in a waste dumping site, which comprises the steps of:

spreading onto the waste over the site or part of it, a covering membrane made of a thermotextile material or of asbestos in order to cover at least part of the dumping site, and then spraying onto the covering membrane from a given distance away from the site, a thin layer of a cementitious product, of a granular soil material or of both a cementitious product and a granular soil material, in order to fully cover said membrane.

The membrane can be spreaded over the inflammated waste by means of helicopters or any heavy equipment provided with telescopic or articulated arms, to reduce as much as possible the risks of injuries for the firemen and workers. Once the mattress is spreaded, the cementitious product or granular soil material may be sprayed by a projecting gun or by blowing. Such a spraying can even be made from helicopters.

When it is covered, either before or during a fire disaster, the waste dumping site is fully protected, in a very safe manner.

The method according to the invention has the following advantages:

first of all, it is very fast and easy to carry out;

second, it is not expensive because a layer of 0.125 to 2 inches may be sufficient in many cases to achieve the required result; in other cases where there is need for an access for some equipment on the site, the thickness of the protection layer may however be increased by the same process;

it can be carried without having to work on the site and it allows easy control of the thickness of the concrete or earth that is blown onto the membrane, at any location;

it reduces the necessity of spraying water onto a dumping site on fire to choke the fire that may occur in dumping sites containing inflammable waste and thus reduces the risk of contamination of the phreatic water and adjacent rivers by infiltration of the water sprayed to choke the fire and minimizes the contamination of the soil in the area;

it permits to rapidly limit the damages caused by a fire by choking the fire and preventing spreading of the same in other areas;

it provides a substantial protection onto the site that may discourage pyromaniacs or other ill-disposed persons to light on a fire;

it may substantially improve the aesthetic and environmental quality of the regions where are located the dumping site; and it permits, whenever desired, to recover the waste, by merely removing the protective cover applied onto the waste.

Thus, the method according to the invention is economically and aesthetically advantageous, in addition of being fast to carry out.

In use, the sheet or membrane of geotextile or thermotextile that is used advantageously covers the gaps that exist between the waste such as, for example, the central hole of the used tires, and thus "bridges" the waste in such a manner that the amount of earth and/or concretous material to be blown or projected is substantially reduced. Moreover, it allows a fire to be choked in a very fast manner. Moreover, the thin layer of concrete or earth covering the membrane advantageously discourage the pyromaniacs in addition of allowing easy conversion of the sight into a nice looking landscape.

DETAILED DESCRIPTION OF THE INVENTION

Figure 1:
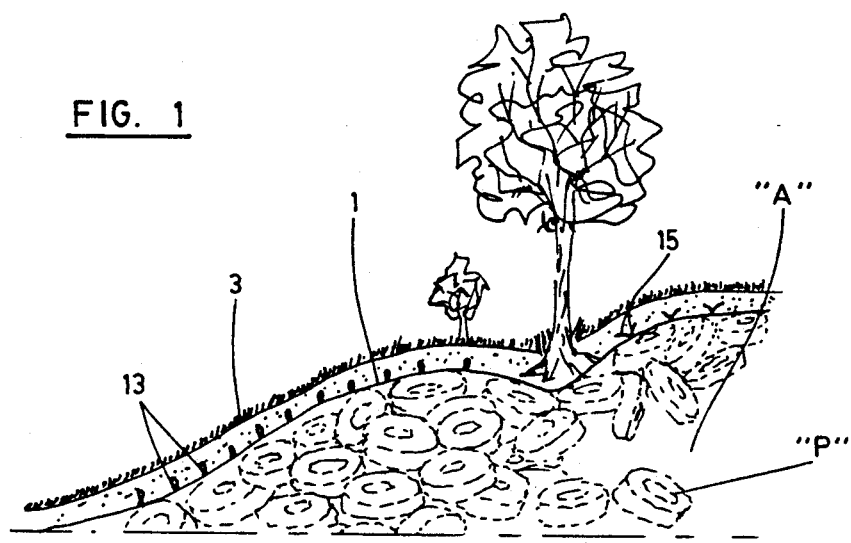
FIG. 1 is a schematic, cross-sectional view of a dumping site covered by a protective cover according to the invention.

FIG. 1 shows a pile of waste A covered by a membrane 1 which is itself covered by a thin layer 3 (of a few inches) of cementitious product or granular soil material sprayed on the membrane 1 from a given distance away from the site using a blower or high pressure projecting pump to do so. As can be seen, the waste A can be arranged in such a manner as to form cavities, poaches or recesses B in which water ponds may be formed or trees may be planted to covert the covered site into a nice looking landscape.

Advantageously, the upper surface of the membrane may be provided with binding means capable of retaining or fixing the cementitious product and/or granular soil material. These means may consist of loops 13 or of loose threads or wires 15 fixed to or formed in the upper surface of the sheet 7 to retain the layer of product or material that is blown or projected to cover the same. The loops 13 and threads or wires 15 may of course be used onto the membrane 1 of the first embodiment.

Figure 2:
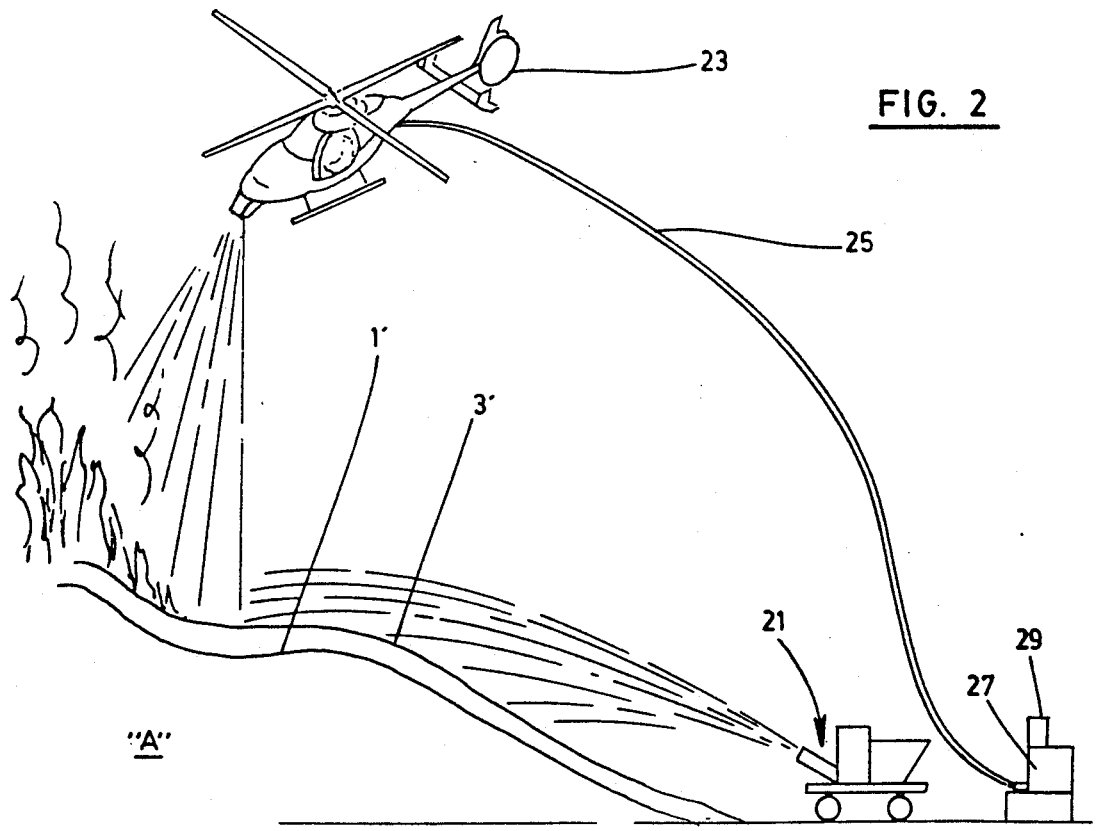
FIG. 2 is a schematic representation of three ways of carrying out the spraying step of the method according to the invention.

FIG. 2 shows three ways of spraying a layer 3' of cementitious product or granular soil material onto a fire-resistant membrane 1' previously spreaded onto waste A' on fire by means of helicopters or heavy equipement provided with telescopic or articulated arms.

A first way of spraying the layer 3' consists in using a high pressure, large discharge output projecting gun 21 positioned at a remote location away from the waste on fire. Such a spraying can be made directly as shown, or via a spraying hose connected to the gun and hand-carried by an operator who may walk close to the fire, even on the covered membrane.

A second way of spraying the layer 3' consists in using a helicopter 23 to support a feed line 25 from which a cementitious product may be sprayed onto the membrane 1'. The cementitious product is supplied to the feed line 26 by a concrete injection or blowing machine 27 operated by a compressor 29.

A third way of spraying the layer 3' consists in using a large helicopter (not shown) like those used by the army, in which the product to be sprayed and the projection unit, eventually provided with a telescopic arm may be stored and used. In such a case, there is no more any connection with the ground.

As can be understood, numerous modifications can be made to the method according to the invention and numerous other applications thereof can be foreseen.

Thus, by way of example, the method according to the invention could be used for the "manufacture" of artificial mountains and/or barriers onto a site to give, for example, a mountaneous aspect to a landscape, to provide anti-noise screens or to stop strong winds that may provoke, especially in countries where weather is very cold, icing of highways or obstruction of the traffic because of some accumulation of snow blown onto the roads. This other application would be particularly interesting, since it would permit to get rid of solid waste such as used tires. Indeed, in order to create an artificial mountain or barriers at a given place and at low cost, use would have to be made of used tires that could be piled up and covered as disclosed hereinabove, by spreading a covering membrane onto the tires to "join" them as a unitary structure, and subsequently covering this membrane by a thin layer of cementitious product or granular material sprayed, blown or projected from a given distance on it.

Accordingly, the method according to the invention can be used not only for hiding from sight and protecting an existing dumping site, but also as a method for creating an artificial site where solid waste could be brought before being covered and hidden. This method may also be used to control wind blow sand.

I claim:

1. A method for hiding from sight and protecting a dumping site containing inflammable and/or bad looking solid waste, said method comprising the steps of:
    a) spreading a covering membrane capable of covering the solid waste and the gaps existing therebetween over the site or part of it; and
    b) spraying onto said covering membrane from a given distance away from the site, a layer of cementitious product, of a granular soil material or of both a cementitious product and a granular soil material, in order to fully cover said membrane,
    wherein, in step (b), any part of said covering membrane that forms a slope, is sprayed with a cementitious product, exclusively.

2. The method of claim 1, wherein the membrane is a geotextile membrane.

3. The method of claim 1, specially designed for protecting a dumping site filled up with inflammable solid waste, wherein the membrane is a thermotextile membrane.

4. The method of claim 1, further comprising the step of:
    using the cementitious product or granular soil material sprayed onto the membrane as a support to convert the site to a landscape.

5. A method for hiding from sight and protecting a dumping site containing inflammable and/or bad looking solid waste, said method comprising the steps of:
    a) spreading a covering membrane capable of covering the solid waste and the gaps existing therebetween over the site or part of it; and
    b) spraying onto said covering membrane from a given distance away from the site, a layer of cementitious product in order to fully cover said membrane
    wherein, in step (a), use is made of a covering membrane having an upper surface with binding means projecting therefrom so that, in step (b), the cementitious material that is sprayed, can embed and adhere to said binding means to avoid sliding, scaling and popping of said covering layer.

6. A method for quickly and economically limiting the damages caused by a fire disaster in a waste dumping site, comprising the steps of:
    spreading a covering membrane capable of covering the solid waste and the gaps existing therebetween over the site or part of it; and
    spraying onto said covering membrane from a given distance away from the site, a layer of a cementitious product, of a granular soil material or of both a cementitious product and a granular soil material, in order to fully cover said membrane
    wherein the covering membrane is spreaded onto the wastes by means of helicopters.

7. The method of claim 6, wherein the covering layer is sprayed onto the covering membrane from said helicopters.

8. A method for quickly and economically limiting the damages caused by a fire disaster in a waste dumping site, comprising the steps of:
    spreading a covering membrane capable of covering the solid waste and the gaps existing therebetween over the site or part of it; and
    spraying onto said covering membrane from a given distance away from the site, a layer of cementitious product, of a granular soil material or of both a cementitious product and a granular soil material, in order to fully cover said membrane wherein the covering membrane is provided with earth or concrete binding means consisting of loops upwardly projecting therefrom.

9. The method of claim 8, wherein the covering membrane is spreaded onto the wastes by means of telescopic or articulated arms.

* * * * *